United States Patent
Mcculloch

(10) Patent No.: US 9,238,192 B2
(45) Date of Patent: Jan. 19, 2016

(54) APPARATUS AND METHOD FOR PROCESSING A GAS STREAM

(75) Inventor: Euan Mcculloch, Glasgow (GB)

(73) Assignee: DOOSAN BABCOCK LIMITED, Sussex (GB)

(*) Notice: Subject to any disclaimer, the term of this patent is extended or adjusted under 35 U.S.C. 154(b) by 304 days.

(21) Appl. No.: 13/994,480

(22) PCT Filed: Dec. 16, 2011

(86) PCT No.: PCT/GB2011/052496
§ 371 (c)(1),
(2), (4) Date: Sep. 3, 2013

(87) PCT Pub. No.: WO2012/080745
PCT Pub. Date: Jun. 21, 2012

(65) Prior Publication Data
US 2013/0333560 A1 Dec. 19, 2013

(30) Foreign Application Priority Data
Dec. 17, 2010 (GB) .................................. 1021413.8

(51) Int. Cl.
*B01D 47/00* (2006.01)
*B01F 3/04* (2006.01)
(Continued)

(52) U.S. Cl.
CPC ............ *B01D 53/1425* (2013.01); *B01D 47/00* (2013.01); *B01D 47/14* (2013.01); *B01D 51/08* (2013.01); *B01D 53/1475* (2013.01);
(Continued)

(58) Field of Classification Search
CPC .......... B01F 3/04; B01D 47/00; B01D 47/14; B01D 51/08

USPC ............... 95/29, 30, 149, 210, 211, 206, 209; 96/290, 243, 296, 175
See application file for complete search history.

(56) References Cited

U.S. PATENT DOCUMENTS 5,866,089 A    2/1999   Mensinger et al.
7,381,378 B2 *  6/2008   McWhorter .................. 422/168

FOREIGN PATENT DOCUMENTS

DE   10 2007 024 995 A1   12/2008
DE   10 2008 039 171 A1   10/2009
(Continued)

OTHER PUBLICATIONS

International Search Report of PCT/GB2011/052496 dated Jul. 31, 2012.
(Continued)

*Primary Examiner* — Robert A Hopkins
(74) *Attorney, Agent, or Firm* — Sughrue Mion, PLLC

(57) ABSTRACT

An apparatus and method for processing of a source gas and for removal of a target gas therefrom. The apparatus has an absorption system having a first containment structure defining a first process volume for containment of a gas phase and an absorbent liquid phase and a regeneration system fluidly downstream of the absorption system having a second containment structure defining a second process volume for containment of a gas phase and an absorbent liquid phase including a heating means to heat the liquid phase. An ultrasound transducer system is provided in association with one or both of the first or second containment structure to apply in use ultrasonic vibration to a part of the said first and/or second containment structure and thus to apply in use ultrasonic vibration to the contents of a part of the first and/or second process volume as the case may be.

25 Claims, 4 Drawing Sheets

(51) Int. Cl.
  *B01D 53/14* (2006.01)
  *B01D 47/14* (2006.01)
  *B01D 51/08* (2006.01)
  *B01D 53/18* (2006.01)
  *F23J 15/04* (2006.01)

(52) U.S. Cl.
  CPC . *B01D53/18* (2013.01); *B01F 3/04* (2013.01); *F23J 15/04* (2013.01); *B01D 2259/816* (2013.01); *F23J 2215/50* (2013.01); *F23J 2219/40* (2013.01); *Y02C 10/06* (2013.01)

(56) References Cited

FOREIGN PATENT DOCUMENTS

| | | |
|---|---|---|
| EP | 0 553 776 A2 | 8/1993 |
| GB | 1 600 131 A | 10/1981 |
| WO | 88/04582 A1 | 6/1988 |

OTHER PUBLICATIONS

Database WPI Week 199524, Thomson Scientific, London, GB; AN 1995-182193, XP002680451.

\* cited by examiner

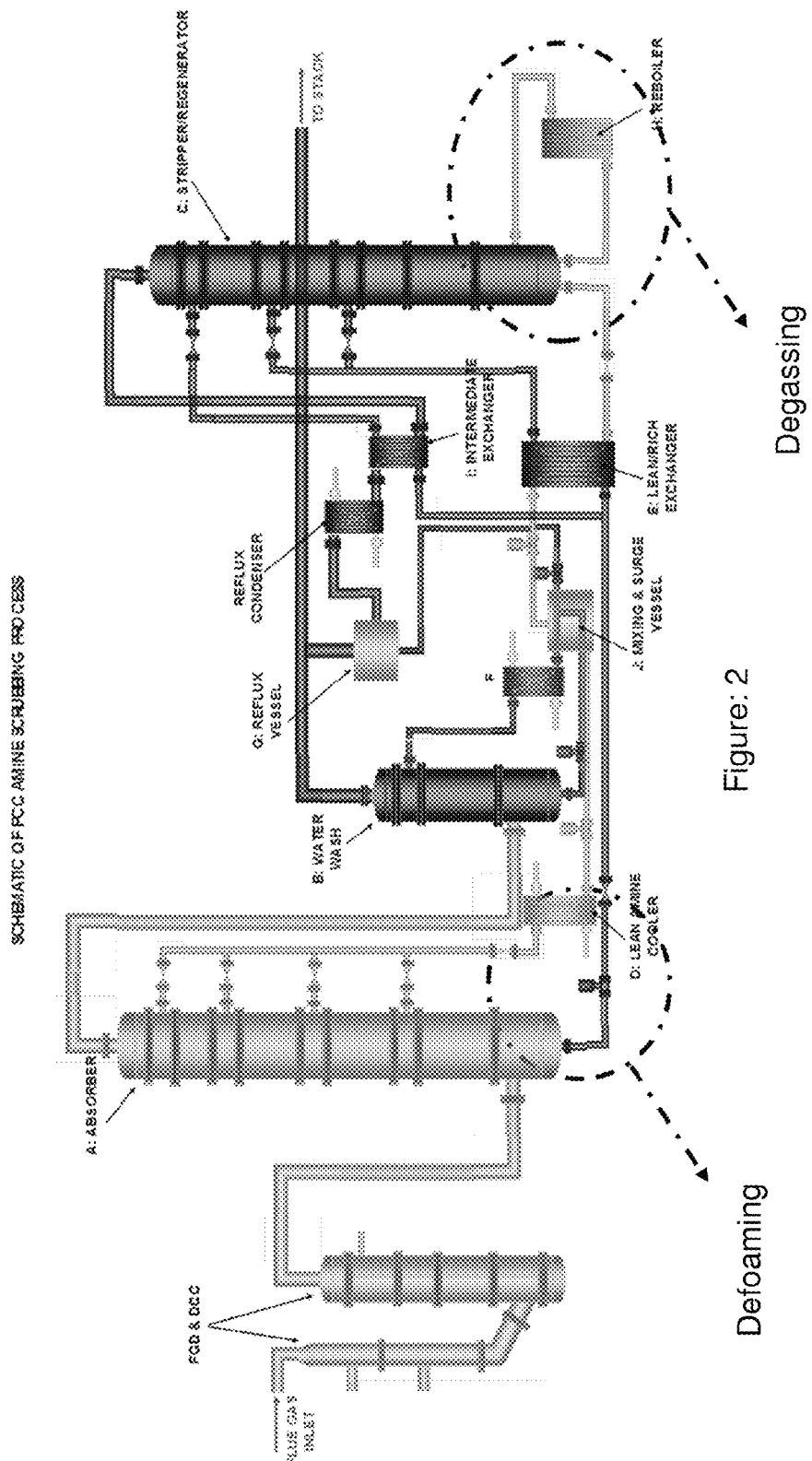
Figure: 2

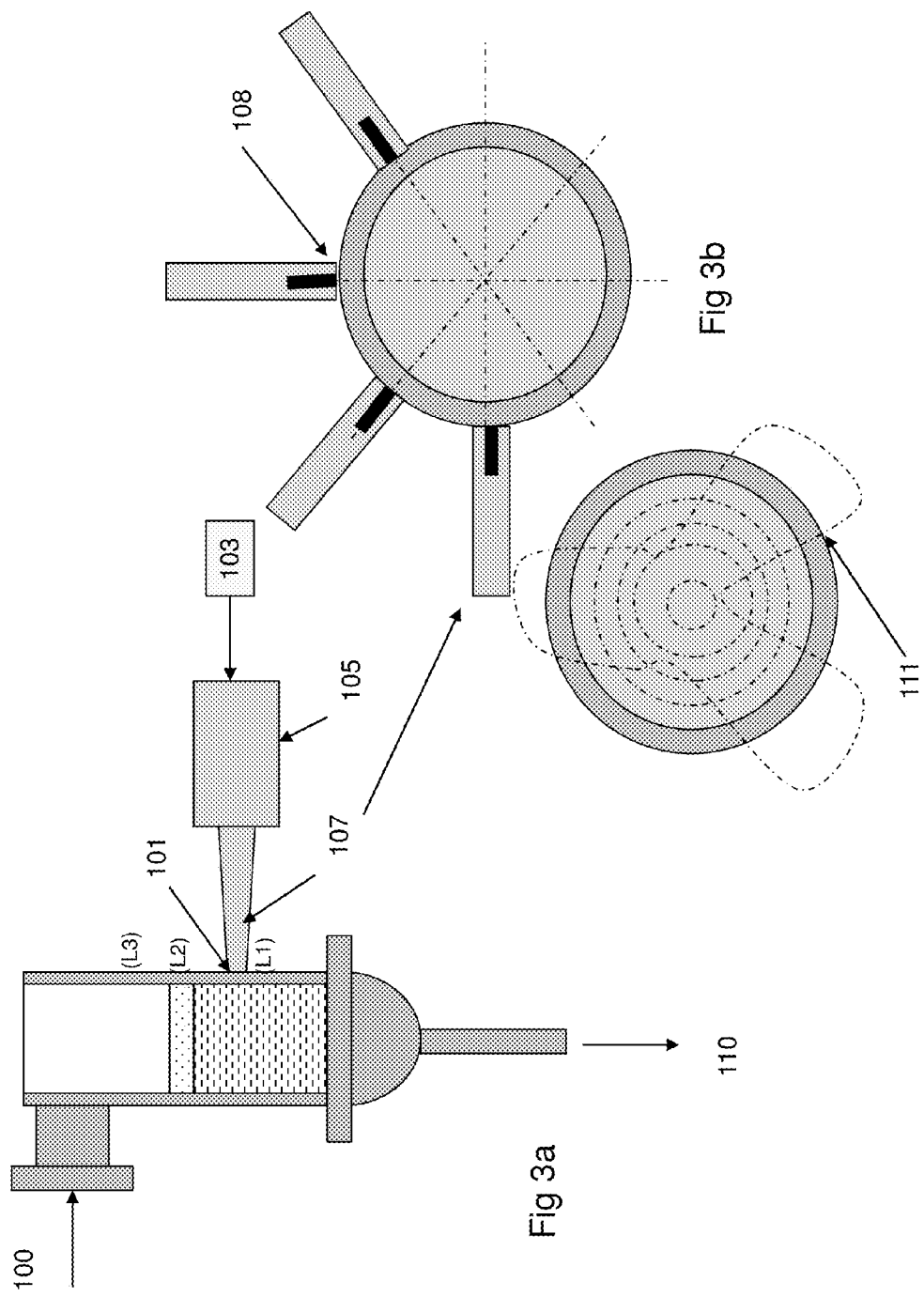

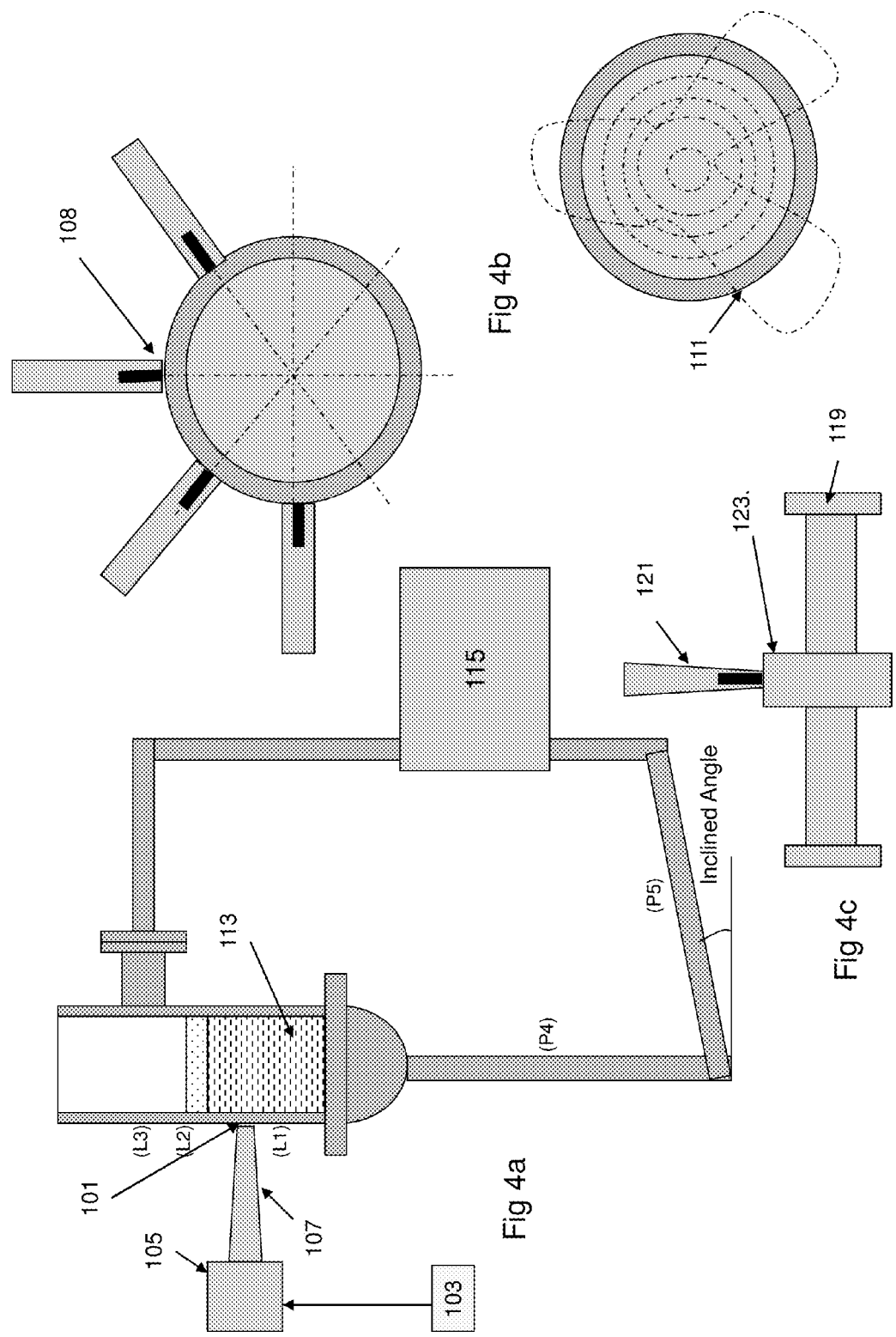

APPARATUS AND METHOD FOR PROCESSING A GAS STREAM

CROSS REFERENCE TO RELATED APPLICATIONS

This application is a National State of International Application No. PCT/GB2011/052496 filed Dec. 16,2011, claiming priority based on United Kingdom Patent Application No. 1021413.8, filed Dec. 17, 2010, the content of all of which are incorporated herein by reference in their entirety.

The invention relates to an apparatus and method for processing of a gas stream and in particular for removal of a target gas from a source gas stream using a regeneratable capture medium for the removal of constituents from a gas phase. The invention for example relates to the removal and capture of acid gases from a gas phase using a regeneratable liquid phase absorbent medium. The invention may relate to the removal of acid gases from a gas phase into a regeneratable liquid phase absorbent medium and/or to the regeneration of the absorbent medium by dissociation of the absorbed gases. The invention is particularly suitable for the removal of $CO_2$ from the flue gases of thermal power plants fired by carbonaceous fossil fuels, and for incorporation into such plants, whether as new build or by retrofitting into or after-market modification of existing plant.

The combustion of fossil fuels such as coal, oil, and natural gas for the generation of electricity is a major contributor to the concentration of $CO_2$ in the atmosphere. Fossil fuel currently supplies over 85% of the world's energy needs, as an established reliable technology for energy production, with low cost and good availability and energy density. A major international effort is therefore required to ensure cost effective energy generation to sustain global economic growth while reducing $CO_2$ emissions.

The worldwide drive to reduce $CO_2$ emissions combined with the continued key role of fossil plant in meeting energy requirements means that carbon capture and storage (CCS) will increasingly be required. Legislation is likely to require new plant to be carbon capture ready and, beyond a certain date, to be CCS equipped from new. It is also likely that existing plant will be required to be CCS retrofitted once the technologies have been demonstrated to be viable at full scale.

Post-combustion carbon capture (PCC) is a means of mitigating the effects of fossil fuel combustion emissions by capturing $CO_2$ from large sources of emission such as thermal power plants which use fossil fuel combustion as the power source. The $CO_2$ is not vented to atmosphere but is removed from flue gases by a suitable absorber and stored away from the atmosphere. Other industrial processes where similar principles might be applicable to capture post-process $CO_2$ might include removal of $CO_2$ generated in a process cycle, for example removal of $CO_2$ from the process flow during production of ammonia, removal of $CO_2$ from a natural gas supply etc.

It is known that acid gases such as $CO_2$ can be separated from a gas phase, for example being the flue gas of a thermal power plant, by means of absorption by passing the gas through a column where the gas flows in an opposite direction to an absorbent in liquid phase, typically in aqueous solution. Such a process is sometimes referred to as wet scrubbing or wet gas sweetening. A well known absorbent reagent comprises one or more amines in water.

In a typical wet scrubber, the flue gas is passed through the absorption solution under conditions of pressure and temperature optimised for removal of substantially all the carbon dioxide into the absorption solution. Packed tower absorber column technology is well established to exploit this. An absorption plant consists of at least one column where liquid absorber is run through the column as the gas that is to be scrubbed is passed in the other direction. The column is usually vertical and the gas introduced into the lower part of the column and fresh absorbent solution is introduced from the top of the column.

Typical columns consist of multiple sections of structured packing consisting of multiple thin plates or like structures to maximize the surface area for mass transfer.

The purified gas emerges at the top of the absorption column and is then directed for further processing as necessary. The absorption solution rich in $CO_2$ or other absorbed target gas is drawn off at the foot of the absorption column and subjected to a stripping process to remove the absorbed target gas and regenerate the absorption solution. Typically this process involves regenerative heating of the solution, for example through successive cycles of reheating and for example by means of a reboiler. The target gas rich solution is for example introduced into a regeneration column, and maintained at high temperature, which may be at or near boiling point under pressure. At higher temperatures the solution will release the absorbed target gas. Regenerated solution may be drawn off for reuse in the absorption column. Vapour containing the stripped $CO_2$ or other target gas emerges at the top of the regeneration column and is passed through a condenser system which condenses the vapour and returns the liquids to the regeneration column. The released target gas may then be collected for example for sequestration.

The quantity of energy required for the process causes an energy penalty to the process system.

Within the plant agitation of absorption solution within the process and in particular within the packing in the absorber column tends to cause foaming of the absorption solution. This foaming causes problems due to fouling of packed beds and subsequent increased pressure drop causing a decrease in efficiency of the process and possible accelerated degradation of the absorption solution.

Currently to alleviate foaming, chemical anti-fouling agents are added to the process to minimise foaming due to agitation, in addition to rigorous chemical cleaning and wash down of the plant at periodic intervals. These chemical anti-fouling agents such as glycol or silicon based agents can cause degradation of the absorption solution and cause the solution to become increasingly viscous. The addition of anti-fouling agents minimises the foaming problem but does not eradicate it completely and skimming of the solution may be required by bleeding solution from the columns at high level prior to the packing and replacing with new solution to replenish the inventory of the process.

It is desirable to develop systems in which the repeated cycling of the absorption solution is carried out in an efficient manner, and/or in a manner that mitigates degradation and increases absorption solution life.

In accordance with the invention there is provided an apparatus for processing of a source gas and for removal of a target gas from a source gas comprising:

an absorption system having a first containment structure defining a first process volume for containment of a gas phase and an absorbent liquid phase so as to be adapted to serve in use as a process volume to effect absorption into the liquid phase of a target gas from a source gas phase;

a regeneration system fluidly downstream of the absorption system having a second containment structure defining a second process volume for containment of a gas phase and an absorbent liquid phase so as to be adapted to serve in use as a process volume to effect in use desorption of the target gas from the liquid phase at least in that it includes a heating means to heat the liquid phase;

wherein there is further provided an ultrasound transducer system in association with one or both of the first containment structure or the second containment structure such as to apply in use ultrasonic vibration to a part of the said first containment structure and/or second containment structure and thus to apply in use ultrasonic vibration to the contents of a part of the first process volume and/or second process volume as the case may be.

In a typical case, as will be familiar, an absorption system may comprise at least one process vessel comprising a primary process volume for the absorption process having an absorbent liquid supply inlet to supply lean absorbent liquid and an absorbent liquid supply outlet to deliver absorbent liquid rich in captured target gas after the absorption process, the latter fluidly communicating with suitable absorbent liquid conduit means. The ultrasound transducer system may be provided in association with the process vessel or with the absorbent liquid conduit means at any point downstream of the absorbent liquid supply inlet.

In a typical case, as will be familiar, a regeneration system may comprise at least one process vessel comprising a primary process volume for the desorption process having an absorbent liquid supply inlet to supply absorbent liquid rich in captured target gas to the process volume for desorption and regeneration for reuse and an absorbent liquid supply outlet, a further reheating vessel for containment of absorbent liquid and application of heat to drive the regeneration process having an absorbent liquid supply inlet and an absorbent liquid supply outlet, and absorbent liquid conduit means between an absorbent liquid supply outlet of the process vessel and an absorbent liquid supply inlet of the reheating vessel. The ultrasound transducer system may be provided in association with the process vessel or with the absorbent liquid conduit means at any point downstream of the absorbent liquid supply outlet from the process vessel and upstream of the absorbent liquid supply inlet of the reheating vessel.

A process vessel comprising a primary process volume for the absorption or desorption reaction is preferably adapted for the countercurrent flow of a liquid phase and a gas phase. The process vessel preferably further comprises a gas phase supply inlet and a gas phase supply outlet suitably adapted to effect this.

Conveniently, a process vessel comprising a primary process volume for the absorption or desorption reaction is an elongate upright columnar vessel, and is adapted for the countercurrent flow of a liquid phase and a gas phase for example in that a liquid inlet is provided towards the top of the vessel, a liquid outlet is provided towards the bottom of the vessel, a gas inlet is provided towards the bottom of the vessel, and a gas outlet is provided towards the top of the vessel.

Preferably, the vessel contains or is adapted to contain, within the process volume defined by the vessel, high surface area packing to maximize surface area for mass transfer during the absorption/desorption process. Preferably, the packing material is a structured packing material. The structured packing material provides a high surface area structure to provide a high gas/liquid contact area per unit volume for high mass transfer, and may be of suitable familiar form, in particular providing plural arrays of thin corrugated metal sheet. The precise nature of the packing material is not pertinent to the invention.

Thus, each of the process vessels comprising a primary process volume for the absorption or desorption reaction is conveniently an otherwise conventional absorption or regeneration column as the case may be. Other features of such a column and in particular other elements typical known to complete the fluid circuit of the absorption or regeneration system and to facilitate the absorption or regeneration reaction will readily be inferred by the skilled person.

The invention is distinctly characterised by the provision of an ultrasound transducer in association with one or both of the absorption or regeneration vessels and/or their associated downstream pipework being so located as to apply in use ultrasonic vibration to a part of the structure thereof and thus to apply in use ultrasonic vibration to the contents of a part of the volume contained within.

The application of ultrasonic vibration is found to facilitate the efficient repeated cycling of the absorption solution. In particular, although the invention is not considered to be limited by a particular theory of operation, it is considered the application of ultrasound may assist in the defoaming of the solution and/or the desorption/degassing of the solution. The invention may embody the application of ultrasound to assist in either objective separately or otherwise. For example, the invention may embody the application of ultrasound to assist in defoaming of the solution at the absorption stage and or the desorption/degassing process at the regeneration stage.

In accordance with the preferred embodiment of the invention, a containment structure defining a process volume comprises a generally vertically disposed vessel with a liquid inlet towards the top of the vessel, a liquid outlet towards the bottom of the vessel, and a liquid transport conduit downstream of the liquid outlet. An ultrasound transducer system may be provided at a point on the vessel above the meniscus level to act on the gas volume within the vessel, at a point on the vessel at the meniscus level, at a point on the vessel below the meniscus level to act on the liquid volume within the vessel, or at a point on the liquid transport conduit downstream of the liquid outlet to act on the liquid volume within the conduit. Combinations of sites may be envisaged.

The use of ultrasound to assist in and/or improve the efficiency of the absorption and regeneration process is the essence of the invention. The absorption and regeneration process may otherwise be conventional.

Although the invention is not limited by mode of operation, various advantages can be envisaged.

In the case of the absorption system, use of high-power ultrasonic systems may provide a mechanical mechanism to de-foam the solution. This could be used to minimise the use of anti-fouling agents. In addition, a reduction in down time of the plant would result as cleaning frequencies and time could be reduced. The high-power ultrasonic systems are either connected directly to the absorber column or pipework or indirectly via singular or multiple tuned components freely supported within the applicable volume. Two particularly preferred embodiments may be identified for the use of ultrasonics in the absorption system to de-foam the solution.

In a first embodiment, an ultrasound transducer system may comprise one or more ultrasonic transducers tuned to a controlled resonant mode of vibration attached directly or indirectly via an architecture of tuned/un tuned components to a sump region of the absorber process vessel such as in use to cause vibrational excitation and subsequently controlled cavitation of the chemical solution within the column. The specific sizes, number, orientation and coupling of the devices to the absorber column would be tailored specifically to the size of the absorber column and volume of chemical solution within.

In an alternative embodiment a freely supported ultrasonic transducer may be inserted at an intermediate stage within the process volume between a sump region of the absorber process vessel and the packed structures within the vessel volume.

Both embodiments are widely applicable to gas sweetening or PCC plants of all scales.

In the case of the regeneration system, use of high-power ultrasonic systems may assist in liberation of absorbed target gas from chemical solution. Currently $CO_2$ is liberated from solution in a pressurised stripper column by heating a $CO_2$ rich absorbent solution to boil off the $CO_2$ and produce a highly concentrated $CO_2$ gas stream. Usually this is done by using a steam system integrated with a reboiler or alternative heat exchanger connected directly to the stripper column. The quantity of energy from steam or other energy source required for the process causes an energy penalty to the process system.

The present invention utilises a high-power ultrasonic system that causes mechanical excitation to the chemical solution within the stripper column, reboiler or pipework containing the $CO_2$ rich absorbent solution. The high-power ultrasonic systems are either connected directly to the stripper column, reboiler or pipework as the case may be containing the $CO_2$ rich absorbent solution or indirectly via singular or multiple tuned components freely supported within the applicable volume.

The high power ultrasonic waves generated cause controlled vibrations to travel through the $CO_2$ rich absorbent solution causing cavitation within the solution that causes localised high temperature areas from bubble collapse that cause $CO_2$ to be released from solution.

The particular construction of the ultrasound transducer system made use of in accordance with the invention is not necessarily pertinent provided it is capable of generating sufficient power to produce the desired effect on the scale required.

An ultrasound transducer system will for example comprise a plurality of ultrasound generator elements. Each element may for example comprise an electroacoustic transducer and a control device for controlled excitation thereof. The electroacoustic transducer may comprise an acoustically coupled vibrator and radiator. The electroacoustic transducer may for example comprise an extensionally vibrating piezoelectric or magnetostrictive transduction element, which acts an exciter of a radiator in the form of a plate. Such devices will be generally familiar.

The absorption and regeneration process chemistry may be generally conventional. For example, in the absorption process a source gas stream containing a target gas is fed into the absorption system and caused to flow countercurrently with absorbent liquid lean in target gas. The process volume is maintained at a relatively lower first temperature. The source gas stream as a result contacts with the lean absorbent liquid and by appropriate selection of absorbent liquid chemistry the target gas to is caused to associate for example chemically with the absorbent liquid. For example in the preferred case the absorbent liquid contains an active sorbent that tends to associate for example chemically with the target gas at the first process temperature.

In the regeneration process absorbent liquid rich in target gas is fed into the regeneration system. The liquid in the process volume is maintained at a relatively higher second temperature, for example being heated in a secondary volume such as a reboiler. By appropriate selection of absorbent liquid chemistry the absorbent liquid at this higher temperature is caused to dissociate from the target gas. For example in the preferred case the absorbent liquid contains an active sorbent that tends to dissociate with the target gas at the second process temperature.

The released target gas may be collected for sequestration or other use. The now lean absorbent liquid may be reused in the absorption system.

The target gas is preferably an acid gas, and is especially $CO_2$. Preferred absorption liquids include solutions of suitable absorbent reagents for the target gas.

Systems for the recovery of $CO_2$ from a gas stream are well established, and suitable chemistries and absorbent reagents are well known. The sorbent reagents may for example comprise one or more amines, for example including but not limited to monoethanolamines or methyl-diethanol-amines, for example in aqueous solution.

The invention in a first aspect comprises an apparatus for processing of a source gas and for removal of a target gas from a source gas comprising an absorption system and a regeneration system, one, other or both of which has been modified by further provision of an ultrasound transducer system in association with a containment structure thereof to apply ultrasonic vibrations to the contents. The skilled person will appreciate that either of an absorption system or a regeneration system so modified may be provided as part of a novel processing apparatus which may otherwise be conventional.

Thus it follows that in accordance with a further aspect of the invention there may be provided an absorption system in accordance with the foregoing principles of the invention. That is, at its broadest, there may be provided an absorption system having a containment structure defining a process volume for containment of a gas phase and an absorbent liquid phase so as to be adapted to serve in use as a process volume to effect absorption into the liquid phase of a target gas from a source gas phase; and an ultrasound transducer system in association with the containment structure such as to apply in use ultrasonic vibration to a part of the said containment structure and thus to apply in use ultrasonic vibration to the contents of a part of the process volume.

Similarly it follows that in accordance with a further aspect of the invention there may be provided a regeneration system in accordance with the foregoing principles of the invention. That is, at its broadest, there may be provided a regeneration system having a containment structure defining a process volume for containment of a gas phase and an absorbent liquid phase so as to be adapted to serve in use as a process volume to effect in use desorption of the target gas from the liquid phase at least in that it includes a heating means to heat the liquid phase; and an ultrasound transducer system in association with the containment structure such as to apply in use ultrasonic vibration to a part of the said containment structure and thus to apply in use ultrasonic vibration to the contents of a part of the process volume.

Preferred features of these further aspects will be understood by analogy with the first aspect.

In accordance with the invention in a further aspect, a method for processing of a source gas and for removal of a target gas from a source gas comprises the steps of:

passing the source gas through an absorption system having a first containment structure defining a first process volume for containment of a gas phase such as to contact with absorbent liquid phase and thereby absorb into the liquid phase a target gas from a source gas phase to produce a target gas rich liquid phase;

passing the target gas rich liquid phase through a regeneration system fluidly downstream of the absorption system having a second containment structure defining a second process volume for containment of a gas phase and an absorbent liquid phase and heating at least a part of the liquid phase within the regeneration system to effect desorption of the target gas from the target gas rich liquid phase;

additionally, applying ultrasonic vibrations to the contents of a part of one or both of the first process volume and the second process volume.

Again, it will be understood that either of an absorption step or a regeneration step modified by the step of applying ultrasonic vibrations may be provided as part of a novel processing method which may otherwise be conventional.

Thus it follows that in accordance with a further aspect of the invention there may be provided a method for processing of a source gas and for removal of a target gas from a source gas that comprises the steps of:

passing the source gas through an absorption system having a containment structure defining a process volume for containment of a gas phase such as to contact with absorbent liquid phase and thereby absorb into the liquid phase a target gas from a source gas phase to produce a target gas rich liquid phase;

additionally, applying ultrasonic vibrations to the contents of a part of the process volume, for example to effect a defoaming function.

Similarly it follows that in accordance with a further aspect of the invention there may be provided a method of degassing a target gas rich liquid phase to remove an absorbed source gas that comprises the steps of:

passing the target gas rich liquid phase through a regeneration system having a containment structure defining a process volume for containment of a gas phase and an absorbent liquid phase and heating at least a part of the liquid phase within the regeneration system to effect desorption of the target gas from the target gas rich liquid phase;

additionally, applying ultrasonic vibrations to the contents of a part of one or both of the first process volume and the second process volume, for example to produce a supplementary desorption effect.

Preferred features of the method aspects will be understood by analogy with the description of the apparatus.

Preferably the gas phase and the absorbent liquid phase are caused to flow countercurrently through the process volumes.

Conveniently a containment structure defining a process volume is provided in the form of a generally vertically disposed vessel with a liquid inlet towards the top of the vessel, a liquid outlet towards the bottom of the vessel, and a liquid transport conduit downstream of the liquid outlet, and wherein the step of applying ultrasonic vibrations to the contents of a part of a process volume comprises applying ultrasonic vibrations to one or more of:

a point on the vessel above the meniscus level to act on the gas volume within the vessel, a point on the vessel at the meniscus level, a point on the vessel below the meniscus level to act on the liquid volume within the vessel, a point on the liquid transport conduit downstream of the liquid outlet to act on the liquid volume within the conduit.

In a possible embodiment of the method, ultrasonic vibrations are applied to the contents of a part of the process volume of the absorption system to de-foam the solution therein.

For example ultrasonic vibrations may be applied to the contents of a part of the process volume of the absorption system to cause vibrational excitation and subsequently controlled cavitation of the solution within the column.

In a possible embodiment of the method, ultrasonic vibrations are applied to the contents of a part of the process volume of the regeneration system to assist in liberation of absorbed target gas from chemical solution.

Other preferred features of the method will be understood by analogy with those discussed for the apparatus and vice versa.

The invention will now be described by way of example only with reference to FIGS. 1 to 4 of the accompanying drawings in which:

FIG. 2 is the general schematic of FIG. 1 showing general locations to which the invention may be applied to the absorption system to defoam the solution therein or to the regeneration system to assist in degassing of absorbed target gas;

FIG. 3 illustrates example concepts for defoaming in the absorption system;

FIG. 4 illustrates example concepts for degassing in the regeneration system.

Figure 1:
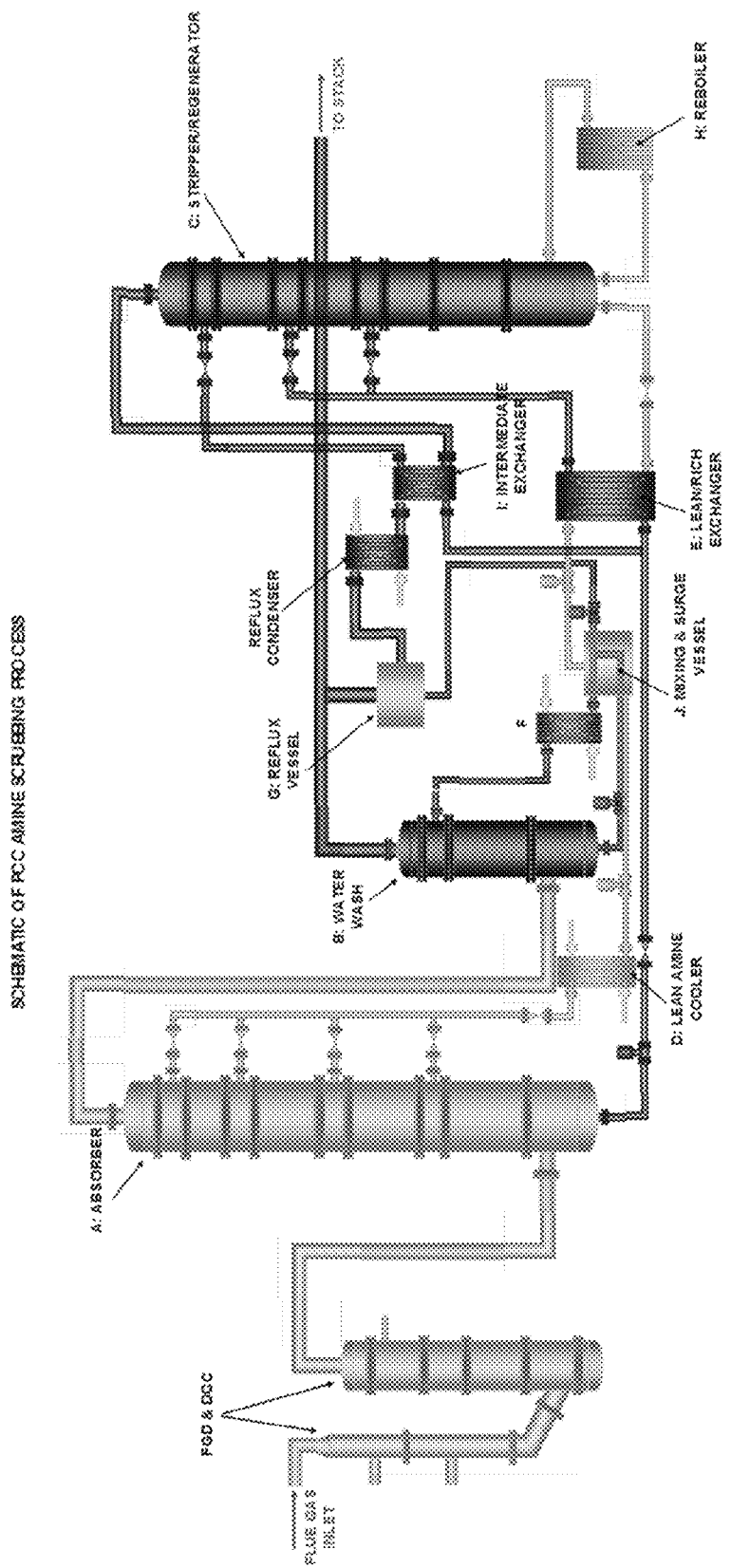
FIG. 1 is a general schematic of a flue gas desulphurisation (FGD) and post combustion carbon capture (PCC) plant to which the invention may be applied.

FIG. 1 illustrates a flue gas desulphurisation (FGD) and post combustion carbon capture (PCC) plant suitable for installation downstream of a combustion flue gas outlet of, for example, a thermal power plant for the treatment of the flue gas in particular to capture and recover carbon dioxide for sequestration or otherwise. It illustrates in particular an example of post combustion carbon capture (PCC) plant to which the invention may be applied. FIG. 2 illustrates two main locations where the invention can be applied in the system of FIG. 1.

Common references are used in FIGS. 1 and 2 as follows:
FGD Flue Gas Desulphurisation
PCC Post-combustion Capture (Amines Scrubbing)
    A Absorber Column
    B Water Wash Column
    C Stripper Column
    D Lean Amine Cooler
    E Lean/Rich Exchanger
    F Water Wash Cooler
    G Reflux Condenser
    H Reboiler
    I Intermediate Exchanger
    J Mixing and Surge Vessel
    K Reflux Vessel
    L Overflow Vessel
    M Rich Amine Pump
    N Lean Amine Pump (V101 Inlet)
    O Water Wash Pump
    P Reflux Pump
    Q Lean Amine Pump (V101 Outlet).

With reference to FIG. 1, the FGD and PCC systems include the following main components:
    ID Booster Fan
    FGD Scrubber
    FGD Heat Exchanger
    FGD Pump
    FGD Storage Tanks
    PCC Absorber
    PCC Water Wash
    PCC Storage Tanks
    PCC Stripper
    PCC Reflux Vessel
    PCC Pumps
    PCC Heat Exchangers
    Pipework, filters, valves and auxiliaries.
    Ductwork and dampers
    Steam Boiler The example FGD column is a wet scrubbing system consisting of two connected sections, the quench section and the $SO_2$ removal zone (scrubber) section. The flue gas is transported by the ID fan from the outlet of the ESP to the quench section of the FGD. The flue gas typically enters the FGD at temperatures up to 150° C. The quench section utilises spray nozzles in concurrent and counter-current configuration, where diluted NaOH solution with dissolved $Na_2SO_3$ and $Na_2SO_4$ reduces the temperature to <55° C. prior to entering the FGD scrubber section.

The scrubber is a packed-bed scrubber. The cooled flue gases, which have been saturated with diluted NaOH and pre-cleaned in the quench scrubber zone, are transported into the lower part of the packed-bed scrubber. The scrubber typically contains two $SO_2$ scrubbing stages, which are separated from each other by a liquid collector tray. The contact zone for $SO_2$ scrubbing is created by the packing restrained in the column which enables the flue gas and the diluted NaOH to mix.

The flue gas enters the scrubber and flows in a counter current configuration in relation to the diluted NaOH chilled via a heat exchanger. The diluted NaOH is supplied at the top of the scrubber above the packed beds and flows into liquid collectors by gravity. The diluted NaOH is supplied to the top of the scrubber by a pump which transports the solution via a heat exchanger that cools the recirculation liquid to the scrubber from approx. 30° C. down to 25° C. The intention of the additional cooling is to get a clean de-sulphurised gas outlet temperature of approx. 30° C.

The de-sulphurised flue gas from the FGD then passes on to the absorption system. The absorption system has a containment structure defining a first process volume for containment of a gas phase and an absorbent liquid phase in the form of an absorber column A. The de-sulphurised flue gas from the FGD enters the base of the absorber column above a high level indicator in the sump. The absorber column is a packed-bed absorber. The de-suphurised flue gas rises up the absorber column and through the packed beds where mixing occurs with lean amine solution supplied in a counter current configuration at different levels in the column above the flue gas inlet. Mixing of the lean amine and the flue gas on the packing surfaces promotes absorption of the $CO_2$ from the flue gas and subsequently produces a $CO_2$ rich amine solution that collects in the sump of the absorber column.

The resultant $CO_2$ denuded flue gas then rises to the top of the absorber and passes through a demister section that captures any entrained particulates remaining within the flue gas stream before exiting out the top of the absorber column. The $CO_2$ denuded flue gas is then transported to the water wash column B to further cleanse and remove any entrained particulates to reduce carry over of amines or other impurities within the flue gas prior to termination at the stack.

The rich amine solution within the sump of the absorber column is pumped via a lean/rich heat exchanger E to pre heat the rich amine solution from approximately 50° C. to 120° C.

The pre-heated prior rich amine solution is passed to a regeneration system having a containment structure defining a process volume for containment of a gas phase and an absorbent liquid phase in the form of a packed bed stripper column. The solution is supplied to the packed bed stripper column above the packed beds.

The rich amine solution entering the packed beds is in a two phase flow as the rich amine solution is reaching its boiling point where $CO_2$ is liberated from the rich amine solution forming lean amine solution.

Similar to the absorber column the stripper column consists of a series of packed beds with a lean amine solution contained at the base in the sump and a gas outlet at the top. The rich amine solution from the absorber column enters the stripper column via the heat exchanger above the packed beds and is transported by gravity into the sump of the column. The stripper column is a pressurised vessel and adapted for the elevated process temperatures of the stripping process. For example, as will be familiar, a bursting disc is installed on the top of the column for safety and is free to vent unrestricted to atmosphere.

The rich amine solution that enters the column above the packed beds mixes with the warmer flue gas that is $CO_2$ rich and preheats it prior to entering a stripper column sump. From the sump of the stripper column the amine solution is transported to two separate systems, the re-boiler and the main storage vessel. A calculated flow of amine solution in the sump of the stripper column is bled off and gravity fed to the re-boiler heat exchanger where it is heated by heat transfer from steam supplied from the electric steam generator. The $CO_2$-rich amine solution boils and wet $CO_2$ is liberated from this solution to create a lean amine solution.

At the exit from the re-boiler heat exchanger there is a two phase flow of lean amine and wet $CO_2$ gas prior to re-entering the stripper column above the high level of the sump. The wet $CO_2$ gas rises up the column and pre-heats in counter current fashion the entering rich amine solution from the absorber column prior to termination out of the top of the vessel to the reflux vessel via two heat exchangers. The heated lean amine solution as it re-enters the stripper from the heat exchanger drains back into the sump of the stripper to maintain level.

A second bleed from the bottom of the stripper column allows the lean amine solution to be pumped from the sump of the stripper to the main storage vessel of the system via the lean/rich heat exchanger and filters to cool and remove particulates. The main storage vessel contains cooled lean amine solution that can then be pumped back to the absorber column via a heat exchanger to ensure the entering temperature prior to entering the absorber is optimal.

The wet $CO_2$ gas from the stripper column is then transported via two heat exchangers to cool the flue gas and condense the water vapour prior to entering the reflux vessel where separation of the $CO_2$ and condensed water occurs. The first heat exchanger cools the flue gas using a bleed from the water wash circuit and the second further cools the flue gas by chilled water from the cooling water circuit. The separated $CO_2$ is transported to downstream processing, for example to a $CO_2$ compression plant in preparation for sequestration.

The water wash circuit allows water to be circulated by pumping from the sump of the water wash column to the top of the water wash column where it is cooled via a heat exchanger connected to the chilled water circuit. The cooled water then enters the water wash column above a packed bed where mixing with the flue gas from the absorber occurs counter currently to remove entrained particulates. The water wash circuit is supplied from the reflux vessel and from the process water tank to ensure level is maintained. The water wash circuit also has a bleed that enables supply to the main storage tank to allow level to be maintained and also a bleed to the dump vessel to prevent high level situation in the system from occurring.

The dump vessel, when the system is fully operational, should be ideally unused but is included to allow lean amine solvent and water to be purged from the system in situations of high level or drain down from the stripper column, water wash and reflux vessel.

The main storage vessel contains the lean amine solution for supply to the system by pumping to the absorber. The main storage system is supplied by a chemical delivery system which ensures the correct volume and concentration of lean amine solution is delivered into the main storage vessel.

FIG. 2 illustrates two main locations where the invention can be applied in the system of FIG. 1. First, the invention can be applied to the sump region of the absorption column and associated pipework to facilitate defoaming during the absorption process. Second, the invention can be applied to the sump region of the regeneration column, reboiler and associated pipework to facilitate degassing.

An ultrasound transducer system may be provided such as to act at a point on the column above the meniscus level to act on the gas volume within the column, at a point on the column at the meniscus level, at a point on the column below the meniscus level to act on the liquid volume within the column sump, or at a point on the pipework downstream of the liquid outlet from the sump to act on the liquid volume within the pipework. Combinations of sites may be envisaged.

FIG. 3 illustrates example embodiments for making use of ultrasonics on the absorption column to facilitate defoaming during the absorption process, with sectional views both in side elevation (3a) and in plan (3b).

Flue gas from the FGD feeds in to the absorber column via inlet (100) above the sump and below the packing. An ultrasound transducer system comprising one or more high power ultrasonic device(s) is provided in association with the column containment structure or such as to apply in use ultrasonic vibration to a part of the structure and thus to the contents. As illustrated in the figure one or more high power ultrasonic devices (101) may be coupled to the absorber column for example at one of three levels (L1) liquid level, (L2) meniscus Level, (L3) air level. Devices may also be coupled to associated pipework (not shown).

A high power ultrasonic system in accordance with the invention may be directly coupled to the absorber column or connected via one or more tuned/untuned components without departing from the scope of the invention. Air-borne ultrasonic devices may be supported inside the absorber column.

In the illustrated embodiment, a single tuned ultrasonic device (101) is shown coupled to the absorber column at a liquid level. The device (101) includes and electrical; supply (103) to a piezoelectric transducer (105) which is coupled to a tuned ultrasonic horn (107). An ultrasonic transducer may be connected via a suitable connection (108) for example A studded threaded connection or welded connection.

In use the high-power ultrasonic system may be employed to cause controlled/uncontrolled cavitation in the lean chemical solution within the absorber column or associated pipework or process components to de-foam the lean chemical solution. This will be achieved by directly or indirectly coupling high-power ultrasonic transducers to the indicated possible areas within the stripper column to transmit mechanical energy specifically ultrasonic vibration to the chemical solution at (i) the liquid solution within the sump, pipework or components containing rich amine solution; (ii) the meniscus of the chemical solution; or (iii) gas level above the chemical solution in the sump. The transmitted mechanical energy will tend to cause cavitation to occur within the chemical solution causing either bubbles to be formed, expand and contract controllably or to collapse causing localised temperature increases that will cause the target gas to be removed from solution.

The high-power ultrasonic system thus destroys foam and reduces the requirement for chemical cleaning of the system, reduces the quantity of anti-fouling agents required, reduces outage time required to clean the process system especially by reducing scale build up on components due to lower volumes and concentrations of anti-fouling agents subsequently reducing the cost for the operator.

The ultrasonic vibration may be applied continuously or intermittently and control means may provide for continuous or intermittent control of the ultrasonic system, for example to control foam production and reduce energy use in the system where required.

A typical mode shape generated due to ultrasonic vibration, RO, R3 etc (111) is shown in the plan view.

The defoaming effect can offer increased operational efficiency in the column illustrated or in any similar PCC/gas sweetening plant by de-foaming the chemical solution causing lower fouling of packed beds in the absorber and pipework thus reducing pressure drop in the system and increasing gas sweetening/PCC plant efficiency.

Rich Amine loaded with $CO_2$ leaves outlet (110) and passes to a lean/rich HE.

FIG. 4 illustrates example embodiments for making use of ultrasonics on the regeneration or stripper column or pipework to facilitate degassing during the regeneration process, with sectional views both in side elevation (4a) and in plan (4b) and a detailed view of a horn assembly (4c).

Again the effect is achieved for example by directly or indirectly coupling high-power ultrasonic transducers to three possible areas within the stripper column at (L1) liquid level, (L2) meniscus Level, (L3) air level and where applicable like reference numerals are used to those for FIG. 3. This transmits ultrasonic vibration to (i) the chemical solution within the sump, pipework or components containing rich amine solution (113); (ii) the meniscus of the chemical solution; or (iii) the gas level above the chemical solution in the sump. Alternative coupling points on the pipework leading from the stripper column to the reboiler (115) are shown as (P4) and (P5) on FIG. 4. Point (P5) situated on angled pipework allows improved $CO_2$ release through the reboiler. The transmitted mechanical energy will cause cavitation to occur within the chemical solution causing bubbles to be formed, expand and contract controllably or to collapse causing localised temperature increases that will tend to cause the target gas to be removed from the solution.

Again, the ultrasonic vibration may be applied continuously or intermittently and control means may provide for continuous or intermittent control of the ultrasonic system, for example to control the process and reduce energy use in the system where required.

FIG. 4c shows a suitable arrangement comprising a spool piece with flange end (119) for insertion in pipework at P4 or P5 from stripper bottom to reboiler inlet. The arrangement has a tuned ultrasonic horn assembly (121) with an increased mass (123) to magnify amplitude of vibration in the spool piece. An angled incline at P5 will aid $CO_2$ once released to rise through reboiler back to column.

In the above description certain preferred locations and certain example structures are discussed. It will be appreciated that these are examples only. The invention encompasses an ultrasound transducer system in association with a part of one or both of the absorber structure or the desorber structure such as to apply in use ultrasonic vibration apply in use ultrasonic vibration to the contents of a part of the process volume therein, for example to assist in defoaming of the solution at the absorption stage and or the desorption/degassing process at the regeneration stage. For example the invention may encompass any degassing that could happen directly in reboiler/heat exchanger if ultrasonic vibrations were applied directly to it, for example to resonate heat exchanger plates or baffles/containment structure of the reboiler. The invention may encompass any defoaming in the packed beds of the absorber column.

Although illustrated with reference to a PCC system for a thermal power plant, the principles of the invention can be applied to any solution based gas sweetening and/or gas recovery process.

The invention claimed is:

1. An apparatus for processing of a source gas and for removal of a target gas from a source gas comprising:
    an absorption system having a first containment structure defining a first process volume for containment of a gas phase and an absorbent liquid phase;
    a regeneration system fluidly downstream of the absorption system having a second containment structure defining a second process volume for containment of a gas phase and an absorbent liquid phase including a heating means to heat the liquid phase;
    wherein there is further provided an ultrasound transducer system in association with one or both of the first containment structure or the second containment structure such as to apply in use ultrasonic vibration to a part of the said first containment structure and/ or second containment structure and thus to apply in use ultrasonic vibration to the contents of a part of the first process volume and/ or second process volume as the case may be.

2. An apparatus in accordance with claim 1 wherein the absorption system comprises at least one process vessel comprising a primary process volume for an absorption process having an absorbent liquid supply inlet and an absorbent liquid supply outlet, the latter fluidly communicating with suitable absorbent liquid conduit means, and wherein the ultrasound transducer system is provided in association with the process vessel or with the absorbent liquid conduit means at any point downstream of the absorbent liquid supply inlet.

3. An apparatus in accordance with claim 1 wherein the regeneration system comprises at least one process vessel comprising a primary process volume for a desorption process having an absorbent liquid supply inlet and an absorbent liquid supply outlet, a further reheating vessel for containment of absorbent liquid and application of heat to drive the regeneration process having an absorbent liquid supply inlet and an absorbent liquid supply outlet, and absorbent liquid conduit means between an absorbent liquid supply outlet of the process vessel and an absorbent liquid supply inlet of the reheating vessel, and wherein the ultrasound transducer system is provided in association with the process vessel or with the absorbent liquid conduit means at any point downstream of the absorbent liquid supply outlet from the process vessel and upstream of the absorbent liquid supply inlet of the reheating vessel.

4. An apparatus in accordance with claim 2 wherein a process vessel is adapted for the countercurrent flow of a liquid phase and a gas phase.

5. An apparatus in accordance with claim 2 wherein a process vessel is an elongate upright columnar vessel.

6. An apparatus in accordance with claim 2 wherein the process vessel is contains high surface area packing to maximize surface area for mass transfer during the process.

7. An apparatus in accordance with claim 1, wherein a containment structure defining a process volume comprises a generally vertically disposed vessel with a liquid inlet towards the top of the vessel, a liquid outlet towards the bottom of the vessel, and a liquid transport conduit downstream of the liquid outlet, and wherein an ultrasound transducer system is provided at one or more of:
    a point on the vessel above the meniscus level to act on the gas volume within the vessel,
    a point on the vessel at the meniscus level,
    a point on the vessel below the meniscus level to act on the liquid volume within the vessel,
    a point on the liquid transport conduit downstream of the liquid outlet to act on the liquid volume within the conduit.

8. An apparatus in accordance with claim 1, wherein an ultrasound transducer system is provided in association with a containment structure defining a process volume of the absorption system at a location suitable to provide a mechanical mechanism to de-foam the solution therein.

9. An apparatus in accordance with any claim 8 wherein the ultrasound transducer system comprises one or more ultrasonic transducers tuned to a controlled resonant mode of vibration attached directly or indirectly via an architecture of tuned/untuned components to a sump region of the absorber process vessel such as in use to cause vibrational excitation and subsequently controlled cavitation of the solution within the column.

10. An apparatus in accordance with any claim 9 wherein the ultrasound transducer system comprises one or more freely supported ultrasonic transducers inserted at an intermediate stage within the process volume between a sump region of the absorber process vessel and packed structures within the vessel volume.

11. An apparatus in accordance with claim 1, wherein an ultrasound transducer system is provided in association with a containment structure defining a process volume of the regeneration system at a location suitable to assist in liberation of absorbed target gas from chemical solution.

12. An apparatus in accordance with claim 1, wherein the ultrasound transducer system comprises a plurality of ultrasound generator elements.

13. An apparatus in accordance with claim 12, wherein each transducer comprises an electroacoustic transducer and a control device for controlled excitation thereof.

14. An apparatus in accordance with claim 13, wherein the electroacoustic transducer may comprise an acoustically coupled vibrator and radiator.

15. An apparatus in accordance with claim 14 wherein the electroacoustic transducer comprises an extensionally vibrating piezoelectric or magnetostrictive transduction element, which acts an exciter of a radiator in the form of a plate.

16. An apparatus in accordance with claim 1 further comprising control means adapted to effect selective continuous or intermittent operation of the ultrasonic transducer system.

17. A regeneration system having a containment structure defining a process volume for containment of a gas phase and an absorbent liquid phase so as to be adapted to serve in use as a process volume to effect in use desorption of the target gas from the liquid phase at least in that it includes a heating means to heat the liquid phase;
    and an ultrasound transducer system in association with the containment structure such as to apply in use ultrasonic vibration to a part of the said containment structure and thus to apply in use ultrasonic vibration to the contents of a part of the process volume.

18. A method for processing of a source gas and for removal of a target gas from a source gas comprising:
    passing the source gas through an absorption system having a first containment structure defining a first process volume for containment of a gas phase such as to contact with absorbent liquid phase and thereby absorb into the liquid phase a target gas from a source gas phase to produce a target gas rich liquid phase;

passing the target gas rich liquid phase through a regeneration system fluidly downstream of the absorption system having a second containment structure defining a second process volume for containment of a gas phase and an absorbent liquid phase and heating at least a part of the liquid phase within the regeneration system to effect desorption of the target gas from the target gas rich liquid phase;

additionally, applying ultrasonic vibrations to the contents of a part of one or both of the first process volume and the second process volume.

19. A method in accordance with claim 18 wherein the gas phase and the absorbent liquid phase are caused to flow countercurrently through the process volumes.

20. An method in accordance with claim 18 wherein a containment structure defining a process volume is provided in the form of a generally vertically disposed vessel with a liquid inlet towards the top of the vessel, a liquid outlet towards the bottom of the vessel, and a liquid transport conduit downstream of the liquid outlet, and wherein the step of applying ultrasonic vibrations to the contents of a part of a process volume comprises applying ultrasonic vibrations to one or more of:
- a point on the vessel above the meniscus level to act on the gas volume within the vessel,
- a point on the vessel at the meniscus level,
- a point on the vessel below the meniscus level to act on the liquid volume within the vessel,
- a point on the liquid transport conduit downstream of the liquid outlet to act on the liquid volume within the conduit.

21. A method in accordance with claim 18 wherein ultrasonic vibrations are applied to the contents of a part of the process volume of the absorption system to de-foam the solution therein.

22. A method in accordance with claim 21 wherein ultrasonic vibrations are applied to the contents of a part of the process volume of the absorption system to cause vibrational excitation and subsequently controlled cavitation of the solution within the column.

23. A method in accordance with claim 18 wherein ultrasonic vibrations are applied to the contents of a part of the process volume of the regeneration system to assist in liberation of absorbed target gas from chemical solution.

24. A method in accordance with claim 19 wherein the ultrasonic vibration is applied intermittently.

25. A method of degassing a target gas rich liquid phase to remove an absorbed source gas that comprises the steps of:
passing the target gas rich liquid phase through a regeneration system having a containment structure defining a process volume for containment of a gas phase and an absorbent liquid phase and heating at least a part of the liquid phase within the regeneration system to effect desorption of the target gas from the target gas rich liquid phase;

additionally, applying ultrasonic vibrations to the contents of a part of one or both of the first process volume and the second process volume, to produce a supplementary desorption effect.

* * * * *